(12) United States Patent
Mosher

(10) Patent No.: US 8,797,652 B2
(45) Date of Patent: Aug. 5, 2014

(54) SKYLIGHT SUNLIGHT REDIRECTOR

(75) Inventor: Bruce David Mosher, Rock Hill, SC (US)

(73) Assignee: VKR Holding A/S, Horsholm (DK)

( * ) Notice: Subject to any disclaimer, the term of this patent is extended or adjusted under 35 U.S.C. 154(b) by 65 days.

(21) Appl. No.: 13/355,178

(22) Filed: Jan. 20, 2012

(65) Prior Publication Data

US 2013/0188261 A1 Jul. 25, 2013

(51) Int. Cl.
*G02B 27/12* (2006.01)
*E04D 13/03* (2006.01)
*G02B 27/08* (2006.01)
*G02B 26/08* (2006.01)

(52) U.S. Cl.
CPC .............. *E04D 13/033* (2013.01); *G02B 27/08* (2013.01); *G02B 26/0808* (2013.01)
USPC .......................................... 359/640; 359/619

(58) Field of Classification Search
CPC ...... E04D 13/033; G02B 27/12; G02B 26/08; G02B 26/0808
USPC ............. 359/619, 640–641, 592–599; 52/200
See application file for complete search history.

(56) References Cited

U.S. PATENT DOCUMENTS

| | | |
|---|---|---|
| 1,254,520 A | 1/1918 | MacDuff |
| 1,504,970 A | 8/1924 | Pascucci |
| 2,858,734 A | 11/1958 | Boyd |
| 2,993,409 A | 7/1961 | Boyd |
| 4,069,812 A | 1/1978 | O'Neill |
| 4,306,769 A | 12/1981 | Martinet |
| 5,099,622 A | 3/1992 | Sutton |
| 5,551,042 A | 8/1996 | Lea et al. |
| 5,648,873 A | 7/1997 | Jaster et al. |
| 5,655,339 A | 8/1997 | DeBlock et al. |
| 5,878,539 A | 3/1999 | Grubb |
| 5,896,712 A | 4/1999 | Chao |
| 5,896,713 A | 4/1999 | Chao et al. |
| 5,983,581 A * | 11/1999 | DeBlock et al. ................ 52/200 |
| 6,035,593 A | 3/2000 | Chao et al. |
| 6,256,947 B1 | 7/2001 | Grubb |
| RE38,217 E | 8/2003 | DeBlock et al. |
| 7,322,156 B1 | 1/2008 | Rillie et al. |
| 7,395,636 B2 | 7/2008 | Blomberg |
| 7,410,284 B2 | 8/2008 | Edmonds |
| 7,546,709 B2 | 6/2009 | Jaster et al. |
| 7,639,423 B2 | 12/2009 | Kinney et al. |
| 7,757,444 B1 | 7/2010 | Halliday |
| 2007/0074468 A1 | 4/2007 | Jaster et al. |
| 2010/0224232 A1* | 9/2010 | Cummings et al. ........... 136/246 |
| 2010/0229854 A1* | 9/2010 | Martin-Lopez ............... 126/698 |
| 2010/0325979 A1 | 12/2010 | Jaster |

* cited by examiner

*Primary Examiner* — Thomas K Pham
*Assistant Examiner* — Vipin Patel
(74) *Attorney, Agent, or Firm* — Nexsen Pruet, LLC

(57) ABSTRACT

A skylight sunlight redirector is provided with ridges, grooves, and/or prisms that control light transmitted through the redirector as incident sunlight angle changes throughout the day.

19 Claims, 11 Drawing Sheets

SKYLIGHT SUNLIGHT REDIRECTOR

TECHNICAL FIELD

The present invention relates generally to a skylight sunlight redirector and, more particularly, to a light transmitting body with ridges, grooves, and/or prisms to advantageously redirect sunlight into or away from a skylight.

BACKGROUND

Skylights provide effective internal lighting for buildings, maximizing visual comfort and reducing energy usage from artificial lighting.

A typical skylight includes a rooftop element through which sunlight enters the skylight structure, the sunlight being transmitted through the skylight structure to the interior of the building. For example, a building skylight may also include a channel through roof trusses, the channel being disposed between the rooftop element and the interior opening of the skylight. Alternatively, a tubular skylight may include a rooftop element and a light conducting tube depending downwardly from the rooftop element and terminating at a room interior.

The sunlight received by a skylight is highly directional. In early morning and late afternoon hours, the incident angle at which sunlight strikes the rooftop element of a skylight is relatively low. Furthermore, at sunrise and sunset, sunlight is attenuated due to its relatively longer passage through the Earth's atmosphere. Conversely, at mid-day, sunlight's incident angle upon a skylight rooftop element is relatively high. During the course of a day, the sun's path through the sky relative to a skylight rooftop element is arcuate relative to the horizon. Furthermore, at mid-day, the sunlight incident angle upon a skylight rooftop element at the Winter solstice is low, while the sunlight incident angle at the Summer solstice is high, with the incident angle varying throughout the year between those two extremes.

It has been found that the irradiance from sunlight arriving at a skylight from a low incident angle may be further reduced before reaching the interior of a building structure, as the sunlight at a low incident angle tends to be reflected several times within the skylight structure, and thereby lessened, before reaching the interior of the building. Furthermore, it has been found that the irradiance received within a building interior from sunlight arriving at a skylight from a high incident angle may be undesirably strong, causing for example "hot spots" within the building interior, inasmuch as such sunlight arrives at the building interior through the skylight structure with fewer reflections, and thereby with retained brilliance, within the skylight structure.

In view of the foregoing, it would be advantageous to control the illuminance within a building received from a skylight throughout the day, and during the change of seasons, as the incident angle of sunlight changes.

SUMMARY OF THE INVENTION

A skylight sunlight redirector is provided. As revealed in the following description and the figures herein, this invention discovers an effective technology that advantageously controls the sunlight transmitted through a skylight as the sunlight incident angle changes.

In accordance with certain aspects of certain embodiments of the present technology, a light transmitting body is provided. The light transmitting body may define a center and a periphery with a plurality of ridges, grooves, and/or prisms disposed within the periphery. The light transmitting body may include a transparent portion that may reside between the center and the periphery and, in some embodiments, that may extend from the center to the periphery. The light transmitting body has a first surface and an opposite second surface. The light transmitting body may define a center axis and, in certain embodiments, the light transmitting body may be symmetrical about that center axis.

In some embodiments, the light transmitting body may define a cross-section that is at least partially curvilinear. In particular configurations, the light transmitting body may be a dome. In some configurations, the light transmitting body may be a convexity.

In certain embodiments, the light transmitting body may include an equatorial side and an opposing polar side. The polar side may be non-refractive in some arrangements. In particular configurations, the light transmitting body may be understood to have opposing East and West sides disposed between the equatorial side and the opposing polar side.

In certain embodiments of the present technology, the light transmitting body may be at least partially transparent.

In accordance with other certain aspects of certain embodiments of the present technology, the light transmitting body may define a plurality of ridges disposed between its center and its periphery. In certain embodiments, each such ridge may define a length with a first end and an opposing second end, each such ridge disposed in a first arc relative to the center. In particular configurations, each such ridge may be disposed in a second arc relative to the periphery of the light disposing body. Each such ridge may define a cross-section that continually varies along the length of the ridge from the first end to the second end.

In some embodiments, the ridges defined by the light transmitting body may comprise a first side and, in certain embodiments, a second side, wherein the first side may face the center of the light transmitting body and the second side may face the periphery of the light transmitting body. Such ridges may be disposed on the bottom of the light transmitting body. Alternatively, in other applications of the present technology, such ridges may be disposed on the top of the light transmitting body.

In accordance with particular aspects of certain embodiments of the present technology, at least some of the ridges defined by the light transmitting body may comprise a Fresnel lens.

In accordance with still other aspects of the present technology, a surface of the skylight sun redirector may carry a plurality of grooves. Each such groove may extend from a first end to an opposite second end and, in some configurations, such cross-section may continually vary from the first end to the second end. In particular embodiments, each such groove may define an arc relative to the center axis of the skylight sun redirector, such arc residing in a plane that is not perpendicular to the center axis. In some embodiments, certain of those grooves may be disposed such that each is not parallel to any other such groove. In particular configurations, each groove may have a triangular cross-section.

In accordance with yet still other certain aspects of certain embodiments of the present technology, the skylight sun redirector may be a convexity. In some embodiments, the convexity may carry a plurality of prisms. Each such prism may extend from a first end to an opposite second end. In particular embodiments, each such prism may define a cross-section that may continually vary from the first end to the second end. In certain embodiments, such prisms may be arcuate relative to the center.

In accordance with still further aspects of other embodiments of the present technology, at least one of the prisms carried by the convexity may be configured to redirect sunlight that is incident upon the East and/or West side of the convexity away from the center of the convexity. It will be appreciated that, in accordance with such an embodiment, sunlight incident upon the convexity from the East and/or West sides at a first angle from the horizontal may be redirected by the prism such that it is transmitted by the convexity to depart at an angle from the horizontal greater than such first angle. In accordance with yet still further aspects of other embodiments of the present technology, at least one of the prisms may be configured to redirect sunlight that is incident upon the convexity from the equatorial side toward the convexity. It will be appreciated that, in accordance with such an embodiment, sunlight that is incident upon the equatorial side of the convexity at a particular angle from the horizontal may be redirected by the prism such that it departs the prism at an angle from the horizontal less than such second angle.

In some embodiments of the present technology, a plurality of the prisms may be non-parallel one-to-another.

In certain configurations, the first ends of the prisms may be disposed on an East side of the convexity and the second ends may be disposed on a West side of the convexity, the prisms extending through an equatorial side of the convexity.

In particular embodiments, the prisms may be carried on the lower surface of the convexity.

The foregoing description sets forth broadly certain features of the present invention so that the detailed description below may be better understood and so that the contributions from this invention may be better appreciated. Additional advantages of the invention will be set forth in part in the detailed description below and in part may be obvious from the detailed description or may be learned by practice of the invention. The advantages of the invention will be realized and attained by means of the elements and combinations particularly pointed out in the appended claims. It is to be understood that both the foregoing general description as well as the following detailed description are only exemplary and merely explanatory, and are not restrictive of the invention.

BRIEF DESCRIPTION OF THE DRAWINGS

The details of the present technology, both as to its structure and operation, can be better understood with reference to the accompanying figures. It should be noted that these figures are not necessarily to scale in all instances.

DETAILED DESCRIPTION

Figure 1:
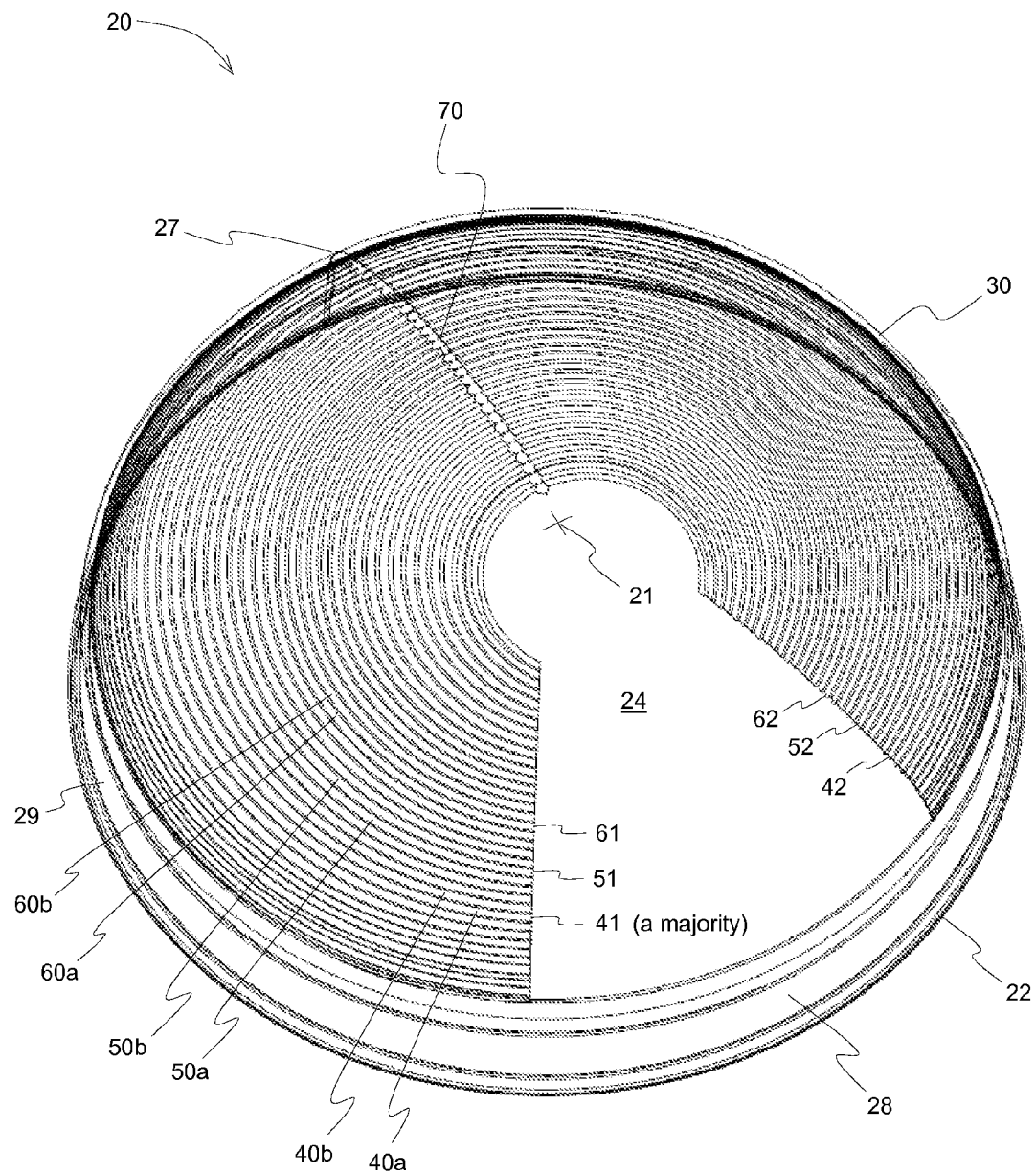
FIG. 1 is a perspective view of a skylight sunlight redirector in accordance with certain aspects of the present invention, from an upper, East-polar perspective.

Reference will now be made in detail to embodiments of the present technology, one or more examples of which are illustrated in the drawings. Selected combinations of aspects of the disclosed technology correspond to a plurality of different embodiments of the present invention. It should be noted that each of the exemplary embodiments presented and discussed herein should not imply limitations of the present subject matter. Features illustrated or described as part of one embodiment may be used in combination with aspects of another embodiment to yield yet further embodiments. Additionally, certain features may be interchanged with similar devices or features not expressly mentioned, which perform the same or similar function.

A skylight sunlight redirector 20 is provided. Redirector 20 is configured to be positioned at the rooftop element of a skylight; in certain applications, redirector 20 itself may constitute the rooftop element of the skylight.

Redirector 20 has a center 21 and a periphery 22. In certain embodiments, redirector 20 may include a transparent zone 23 that allows transmission of sunlight without refraction. Redirector 20 has a first surface 24 and an opposite second surface 25. A center axis 26 may be understood to extend perpendicularly through redirector 20 in some embodiments. In particular embodiments, redirector 20 may define a cross-section that is at least partially curvilinear. In particular embodiments, redirector 20 may comprise a dome. In certain embodiments, redirector 20 may comprise a convexity.

Redirector 20 may be further understood to have an equatorial side 27, an opposing polar side 28, and an East side 29 and West side 30 disposed between equatorial side 27 and polar side 28.

Redirector 20 may define a plurality of ridges, for examples ridges 40a, 40b. Each such ridge, for example 40a, may have a first end 41 and an opposing second end 42. In profile, each such ridge, for example 40a, may have a first side 43 and a second side 44. Each such ridge, for example 40a, may reside in a plane 45. So configured, each such ridge, for example 40a, may be disposed in a first arc relative to center 21 and may likewise be disposed in a second arc relative to periphery 22. Each such ridge, for example ridge 40a, may also define a cross-section that is continually varying from first end 41 to second end 42.

Redirector 20 may be understood to carry a plurality of grooves, for examples grooves 50a, 50b. Each such groove, for example groove 50a, may have a first end 51 and a second end 52. In certain embodiments, each such groove, for example groove 50a, may reside in a plane 53 that is not perpendicular to certain axis 26.

Redirector 20 may carry a plurality of prisms, for examples prisms 60a, 60b. Each such prism, for example prism 60a, may have first end 61 and a second end 62. In certain embodiments, each such prism, for example prism 60a, may reside in a plane 63 and plane 63 may be oriented such that it is not perpendicular to center axis 26.

In certain embodiments for certain applications, a draining profile 70 may be included. In particular embodiments, draining profile 70 may be a raised water draining rib, whereas in other embodiments draining profile 70 may be a depressed water draining channel. Draining profile 70 may allow condensation to drain off of redirector 20.

FIG. 1 illustrates one embodiment of the present technology. As depicted in FIG. 1, redirector 20 is illustrated as a convexity. Redirector 20 is shown to include a center 21 and a periphery 22. Likewise, the illustration of FIG. 1 includes a transparent zone 23. From the perspective displayed in FIG. 1, a first surface 24 is presented. Also illustrated in FIG. 1 is equatorial side 27, polar side 28, East side 29, and West side 30.

A draining profile 70 is also depicted in FIG. 1.

For illustrative purposes, ridges 40a, 40b are depicted in FIG. 1. Each such ridge 40a, 40b begins at a first end, for example first end 41, and ends at a second end, for example second end 42.

For other illustrative purposes, FIG. 1 may also be understood to depict a plurality of grooves, for example grooves 50a, 50b. Each such groove begins at a first end, for example first end 51, and ends at a second end, for example second end 52.

For further illustrative purposes, FIG. 1 may be further understood to depict a plurality of prisms, for example prisms 60a, 60b. Each such prism begins at a first end, for example first end 61, and ends at a second end, for example second end 62.

Figure 2:
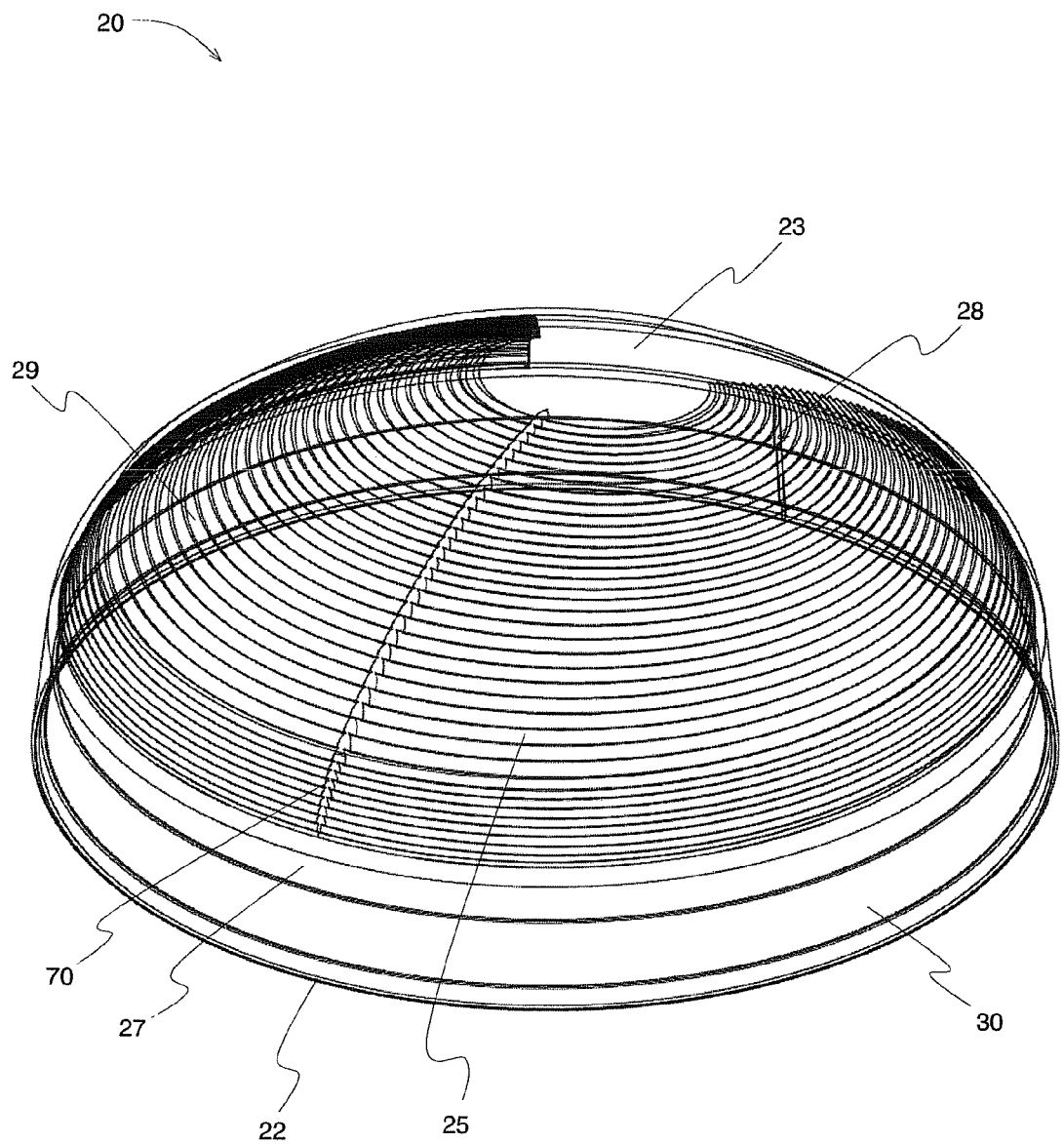
FIG. 2 is a perspective view of a skylight sunlight redirector in accordance with certain aspects of the present invention, from a lower, East-polar perspective.

FIG. 2 illustrates an embodiment of redirector 20 from a different perspective. Illustrated in FIG. 2 is periphery 22, a transparent zone 23, and a portion of second surface 20. Equatorial side 27, polar side 28, East side 29, and West side 30 are also shown. A draining profile 70 has also been included in the embodiment depicted in FIG. 2.

Figure 3A:
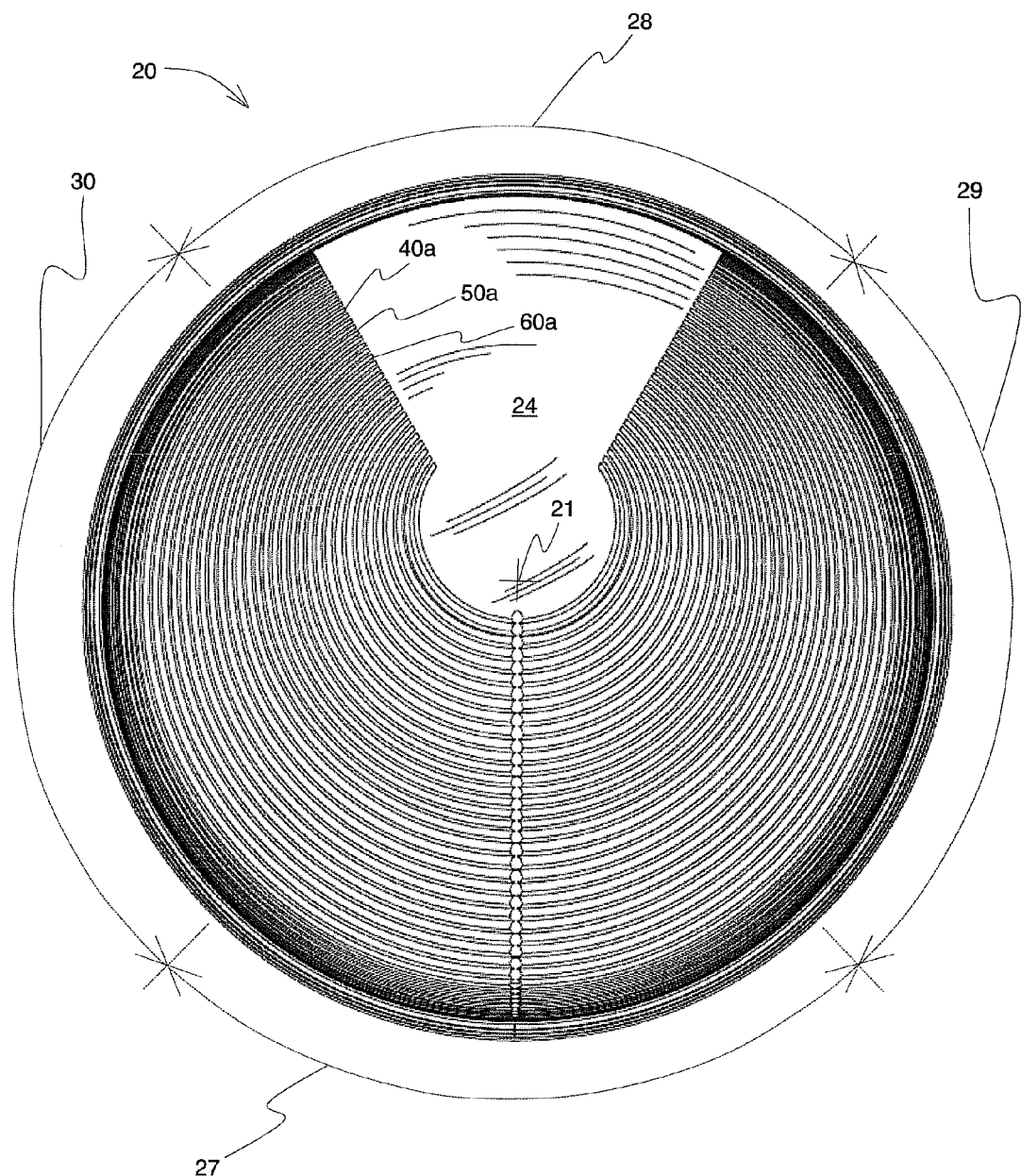
FIG. 3A is a plan view of a skylight sunlight redirector in accordance with certain aspects of the present invention.

FIG. 3A depicts certain features of a particular embodiment of redirector 20. As illustrated therein, equatorial side 27 is opposed by polar side 28, and East side 29 and West side 30 are disposed between equatorial side 27 and polar side 28. Inasmuch as the embodiment depicted in FIG. 3A is round in plan view, sides 27, 28, 29, and 30 will be appreciated as only generalizations in such an embodiment rather than precisely-dimensioned geometries and are illustrated in FIG. 3A only as same.

FIG. 3A also depicts center 21. From the illustration of FIG. 3A, it may be understood that ridge 40a, groove 50a and/or prism 60a, as exemplary of other such ridges, grooves, and/or prisms, may be arcuate relative to center 21. In certain embodiments, ridges 40a, grooves 50a, and/or prisms 60a may be arcuate centered upon center 21 (not shown).

FIG. 3A illustrates redirector 20 from the perspective of depicting second surface 24.

Figure 3B:
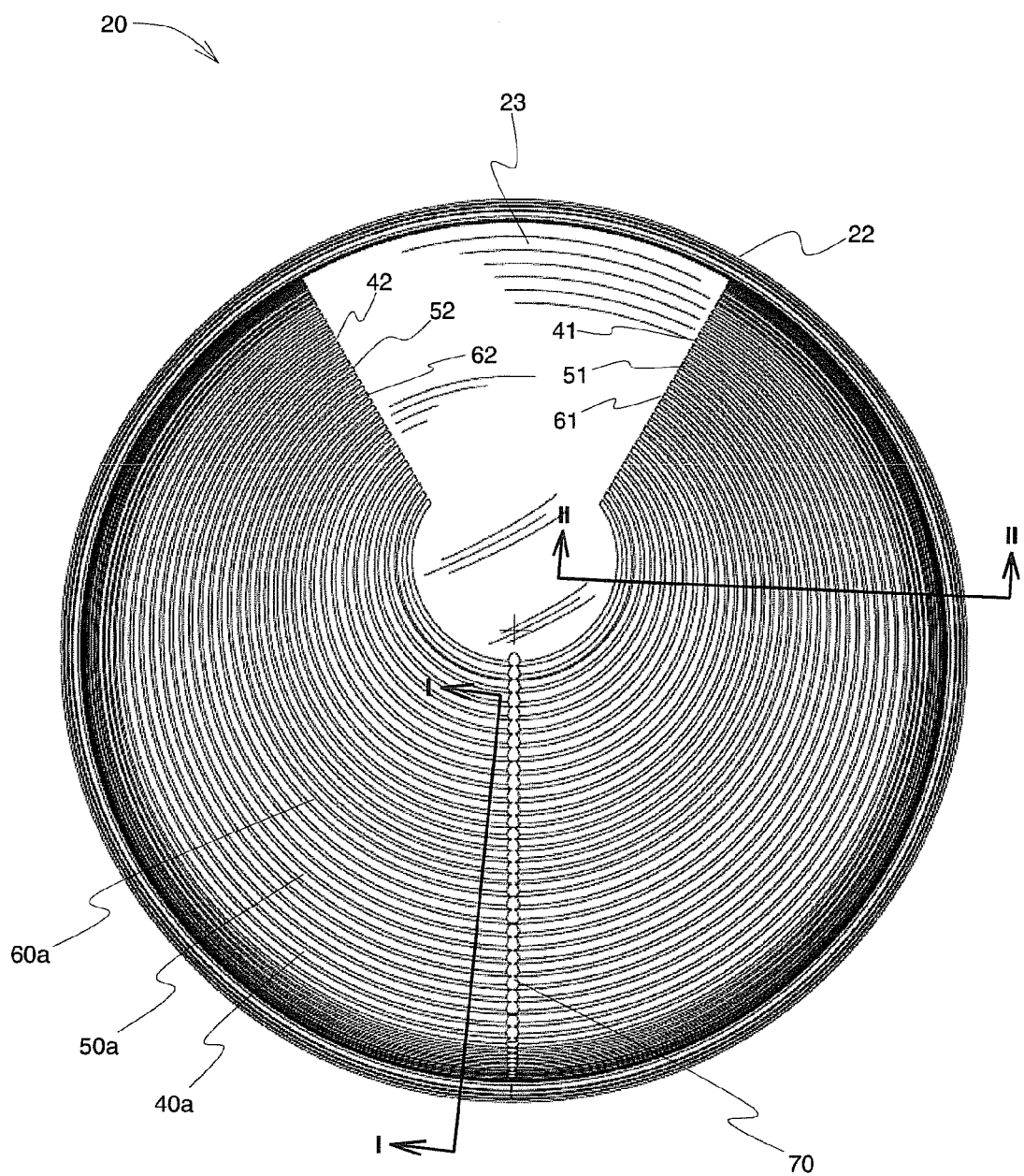
FIG. 3B is a plan view of a skylight sunlight redirector in accordance with certain aspects of the present invention.

FIG. 3B illustrates the same embodiment of redirector 20 as FIG. 3A from a different perspective and is offered for further description of aspects of such embodiment. As depicted therein, periphery 22 surrounds center 21 and transparent zone 23 is included in such embodiment. In certain particular embodiments transparent zone 23 may be non-refractive.

Equatorial side 27 is also illustrated in FIG. 3B and a draining profile 70 has been included in the illustrated embodiment. In use, redirector 20 is installed with equatorial side 27 oriented toward the Earth's equator; for example, in the Northern hemisphere, equatorial side 27 is oriented toward the South. With embodiments that include draining profile 70, draining profile 70 may be advantageously used to point more directly toward the Earth's equator.

It will also be observed in FIG. 3B that the ridges, grooves, and/or prisms, for examples ridges 40a, grooves 50a, and prisms 60a, may comprise arcs of greater than 180 degrees. So configured, the ridges, grooves, and/or prisms, for examples, ridges 40a, grooves 50a, and prism 60a may capture a more low incident angle sunlight during days near the Summer solstice. Additionally, such increased arc angles also allow a tolerance for slight misalignment upon installation of redirector 20 upon a roof. In certain embodiments, such arcs may be approximately 300 degrees.

Figure 4:
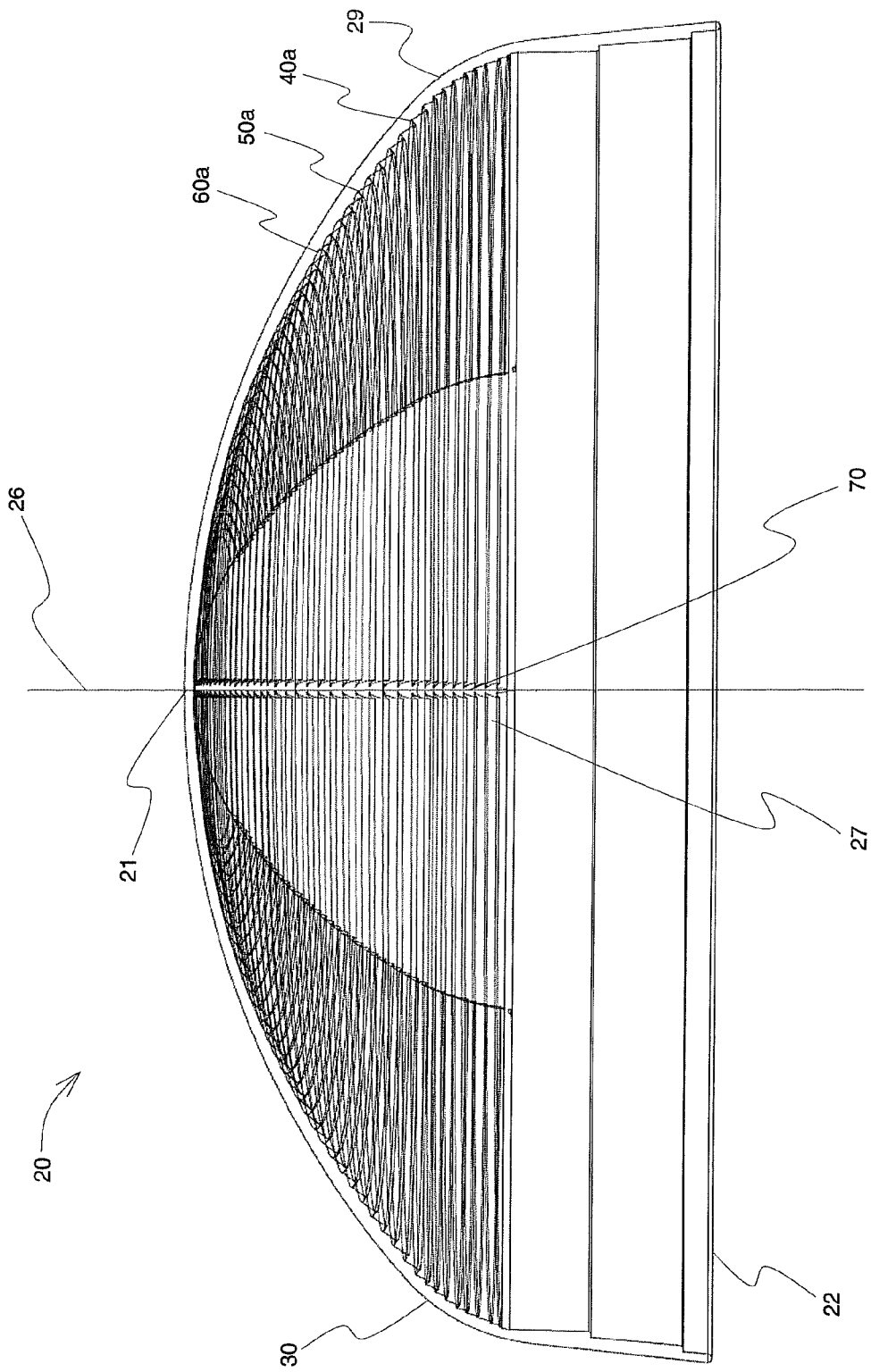
FIG. 4 is an equatorial elevation view of a skylight sunlight redirectory in accordance with certain aspects of the present invention.

FIG. 4 illustrates an embodiment of redirector 20 in which redirector 20 is a dome. FIG. 4 represents an elevation view of redirector 20 from equatorial side 27. The embodiment illustrated in FIG. 4 is a redirector 20 symmetrical about center axis 26.

Figure 5:
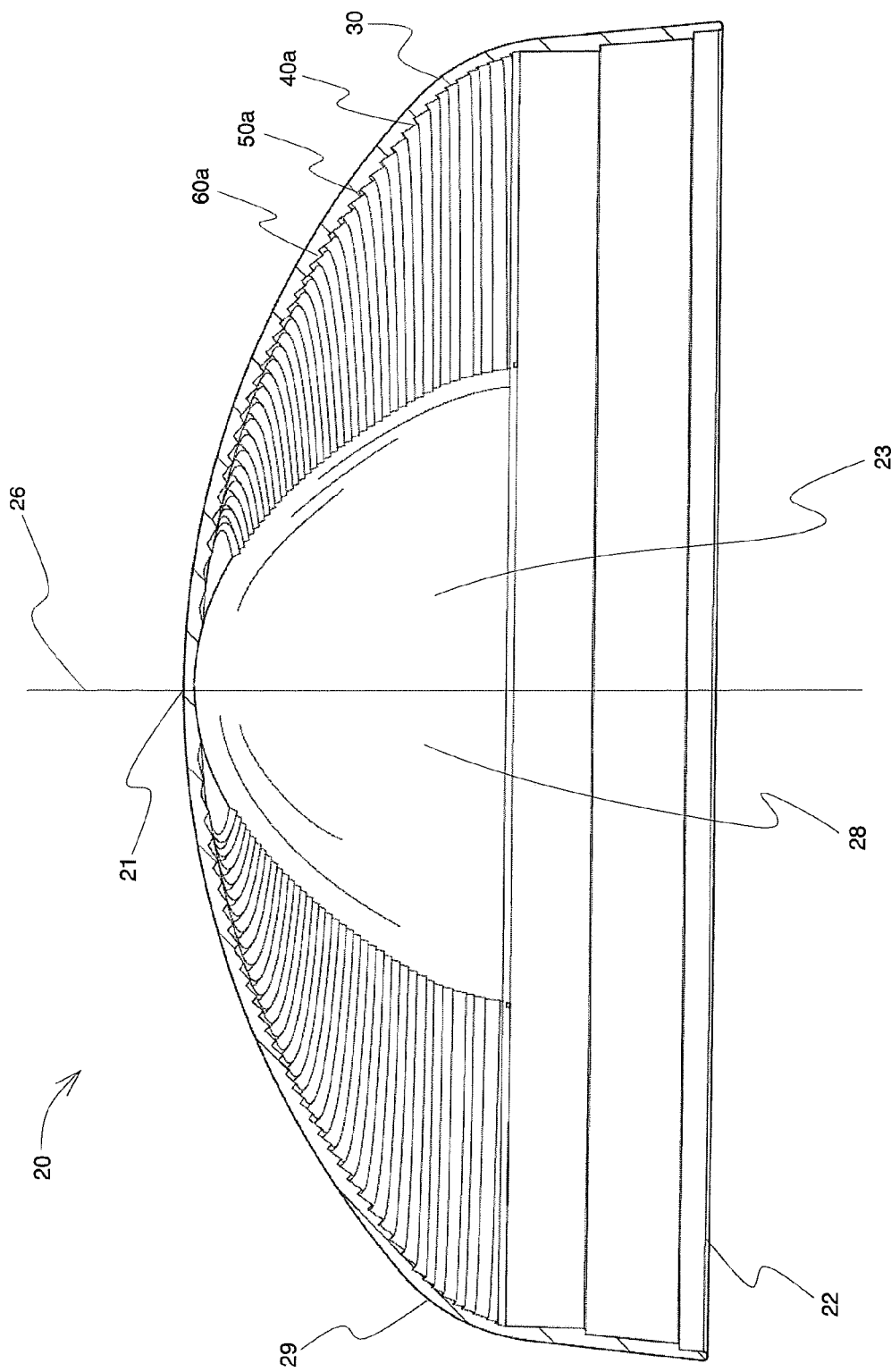
FIG. 5 is a polar elevation view of a skylight sunlight redirector in accordance with certain aspects of the present invention.

FIG. 5 illustrates a plan view of the redirector 20 of FIG. 4 from polar side 28.

Figure 6:
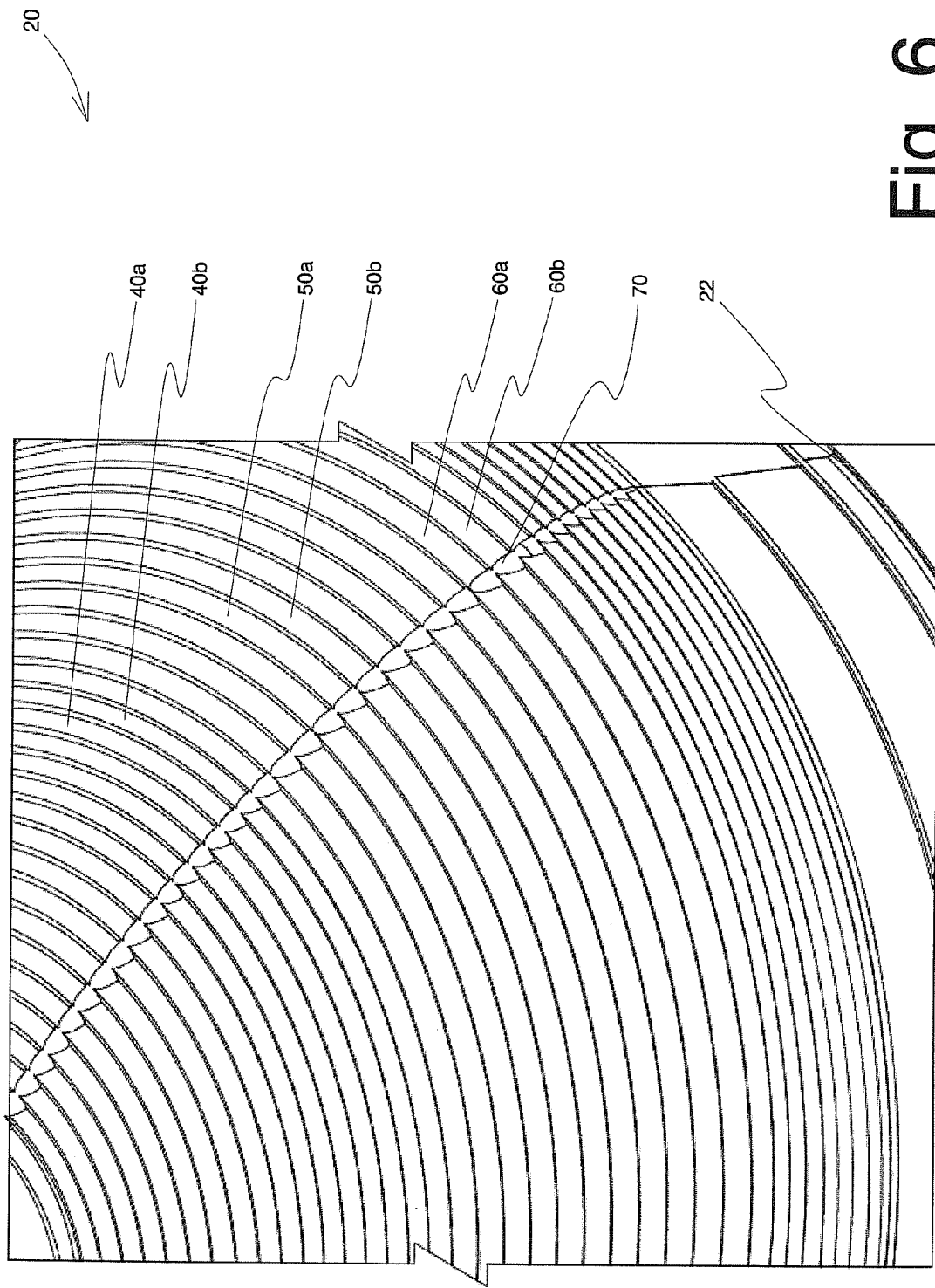
FIG. 6 is a broken view of a detail of a skylight sunlight redirector in accordance with certain aspects of the present invention.

FIG. 6 shows an embodiment of redirector 20 that includes draining profile 70. In certain particular embodiments, draining profile 70 may be configured as a raised rib to allow condensation to drain off the dome surface. In other particular embodiments, draining profile 70 may be configured as a depressed channel to promote the drainage of water from the dome surface. In certain embodiments, draining profile 70 may be disposed on first surface 24 but in other embodiments draining profile 70 may be disposed on second surface 25.

Figure 7:
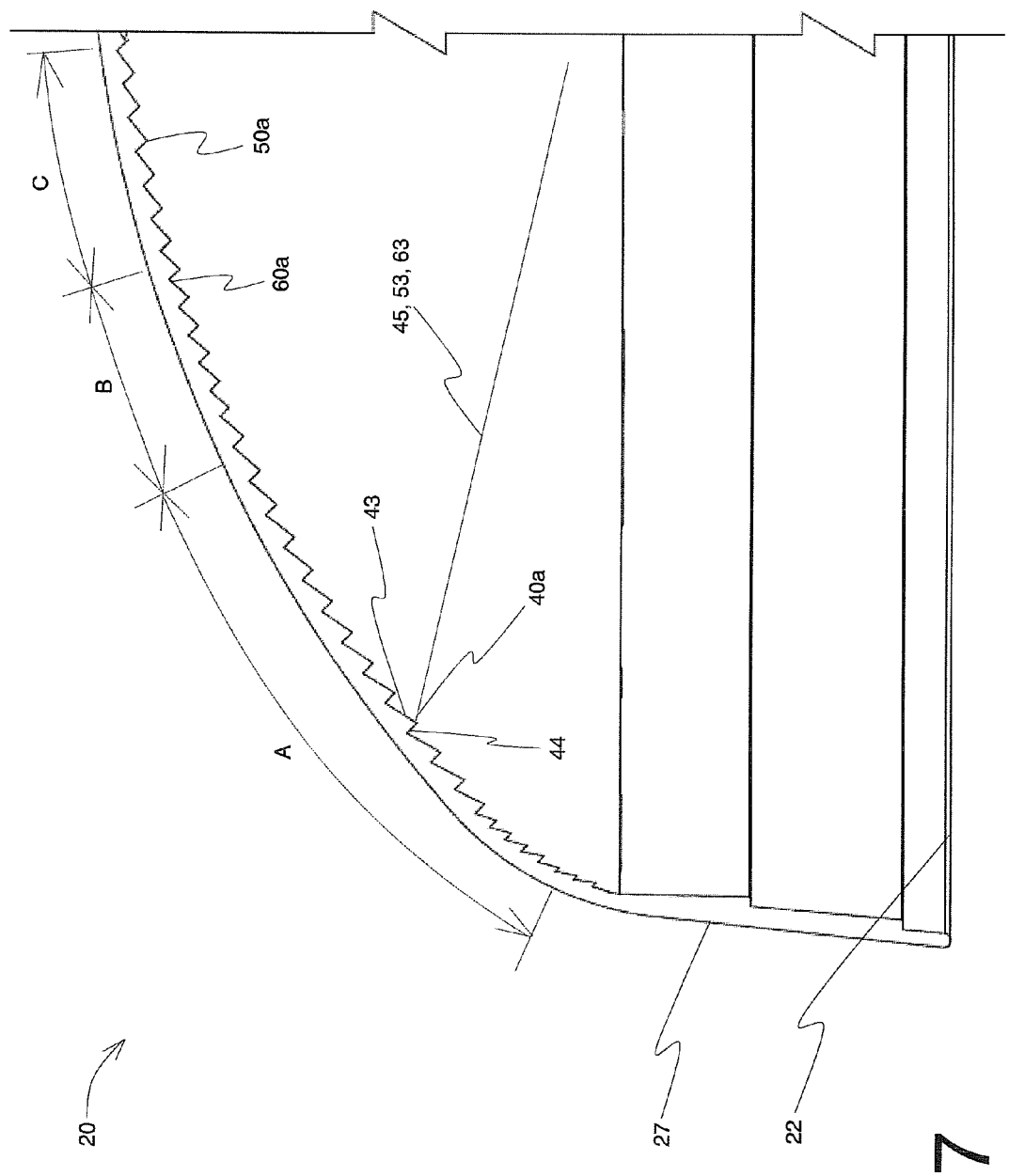
FIG. 7 is a partial sectional view, taken along line I-I in FIG. 3B, of a skylight sunlight redirector in accordance with certain aspects of the present invention.

FIG. 7 shows certain features of a particular embodiment of redirector 20. As illustrated in FIG. 7, redirector 20 may include a cross-section that is at least partially curvilinear. FIG. 7 also depicts a ridge 40a that includes first side 43 and second side 44. As illustrated in FIG. 7, first side 43 faces the center 21 of redirector 20 whereas second side 44 faces the periphery 22 of redirector 20.

FIG. 7 also illustrates the inclusion of a groove 50a. As can be appreciated from FIG. 7, groove 50a is triangular. FIG. 7 also may be understood to depict a prism 60a. In the embodiment of FIG. 7, the ridges, grooves, and/or prisms, for examples ridge 40a, groove 50a, and prism 60a, have been configured on the bottom of redirector 20, but in other embodiments (not shown) they may be disposed on the top of redirector 20.

As may be observed in FIG. 7, the grooves, for example groove 50a, have a cross-section that varies along the surface of redirector 20. For illustrative purposes, redirector 20 illustrated in FIG. 7 has been labeled to include zones A, B, and C; the cross-sections of the grooves, for example groove 50a, continues to vary in geometry between grooves disposed near periphery 22 and those nearer center 21 (not shown). For example, the representative groove in zone A may have a first side 43 of approximately 3.83 millimeters in length and a second side 44 of approximately 1.62 millimeters in length, with an angle between a first side 43 of one such groove and an opposing second side 44 of an adjacent such groove residing at an angle of about 72 degrees. By comparison, a representative groove from zone B may have a first side 43 about 2.7 millimeters in length and a second side 44 of about 2.0 millimeters in length, with the angle between a first side 43 of one such groove and an opposing second side 44 of an adjacent such groove residing at an angle of about 108 degrees. By further comparison, a representative groove from zone C may have a first side 43 of about 4.0 millimeters in length and a second side 44 of about 3.6 millimeters in length, with an angle between a first side 43 of one groove and a second side 44 of the adjacent groove residing at an angle of about 107 degrees.

The cross-sections of ridges, grooves, and/or prisms depicted in FIG. 7, for example ridges 40*a*, grooves 50*a*, and prism 60*a*, are taken at approximately line I-I in FIG. 3B, but in certain embodiments of redirector 20 such cross-sections continually vary along the length of such ridges, grooves, and/or prisms, respectively.

FIG. 7 also illustrates that the ridges, grooves, and/or prisms, for example ridge 40*a*, groove 50*a*, and prism 60*a*, reside in a plane 40, 53, and 63, respectively. As illustrated in FIG. 7, plane 40, 53, and 63 may reside at an acute angle relative to center axis 26 rather than being perpendicular to center axis 26.

Figure 8:
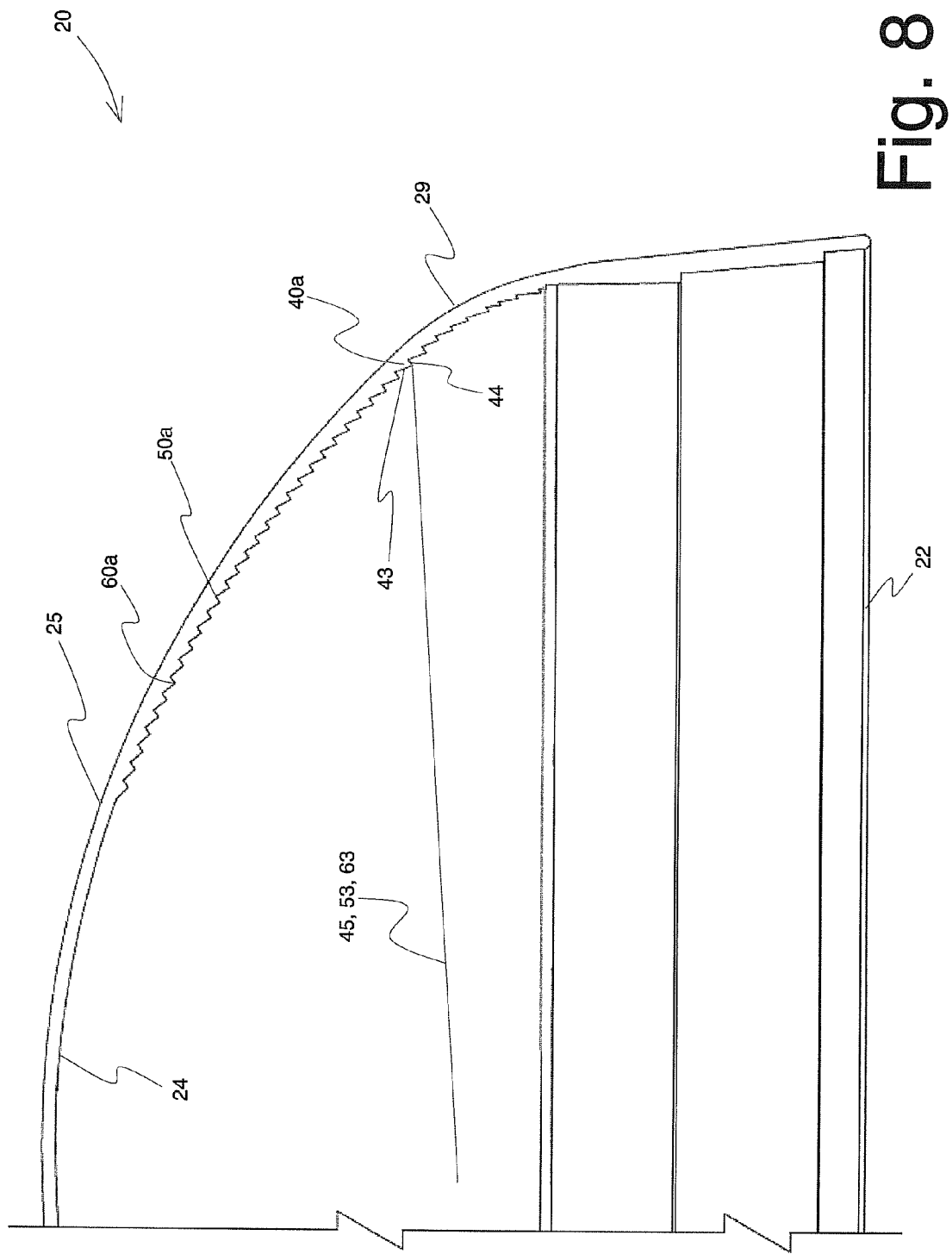
FIG. 8 is a partial sectional view, taken along line II-II in FIG. 3B, of a skylight sunlight redirector in accordance with certain aspects of the present invention.

FIG. 8 illustrates that the ridges, grooves, and/or prisms, for example ridge 40*a*, groove 50*a*, and prism 60*a*, have cross-sections, respectively, that vary along their length.

Figure 9:
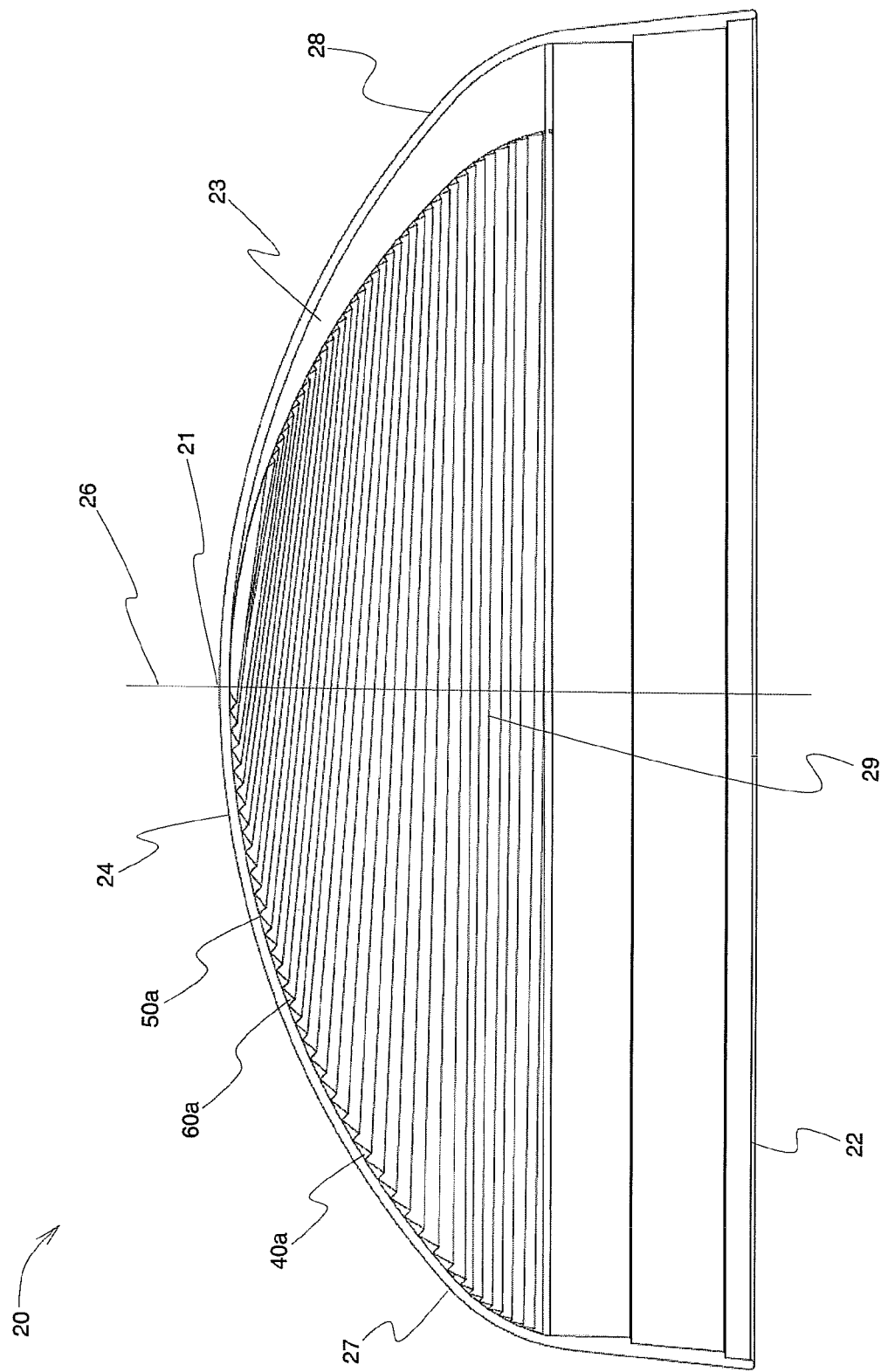
FIG. 9 is a plan view of the East side of a skylight sunlight redirector in accordance with certain aspects of the present invention.

The embodiment illustrated in FIG. 9 illustrates ridges, grooves, and/or prisms, for examples ridge 40*a*, groove 50*a*, and prism 60*a*, not parallel one-to-another.

Figure 10:
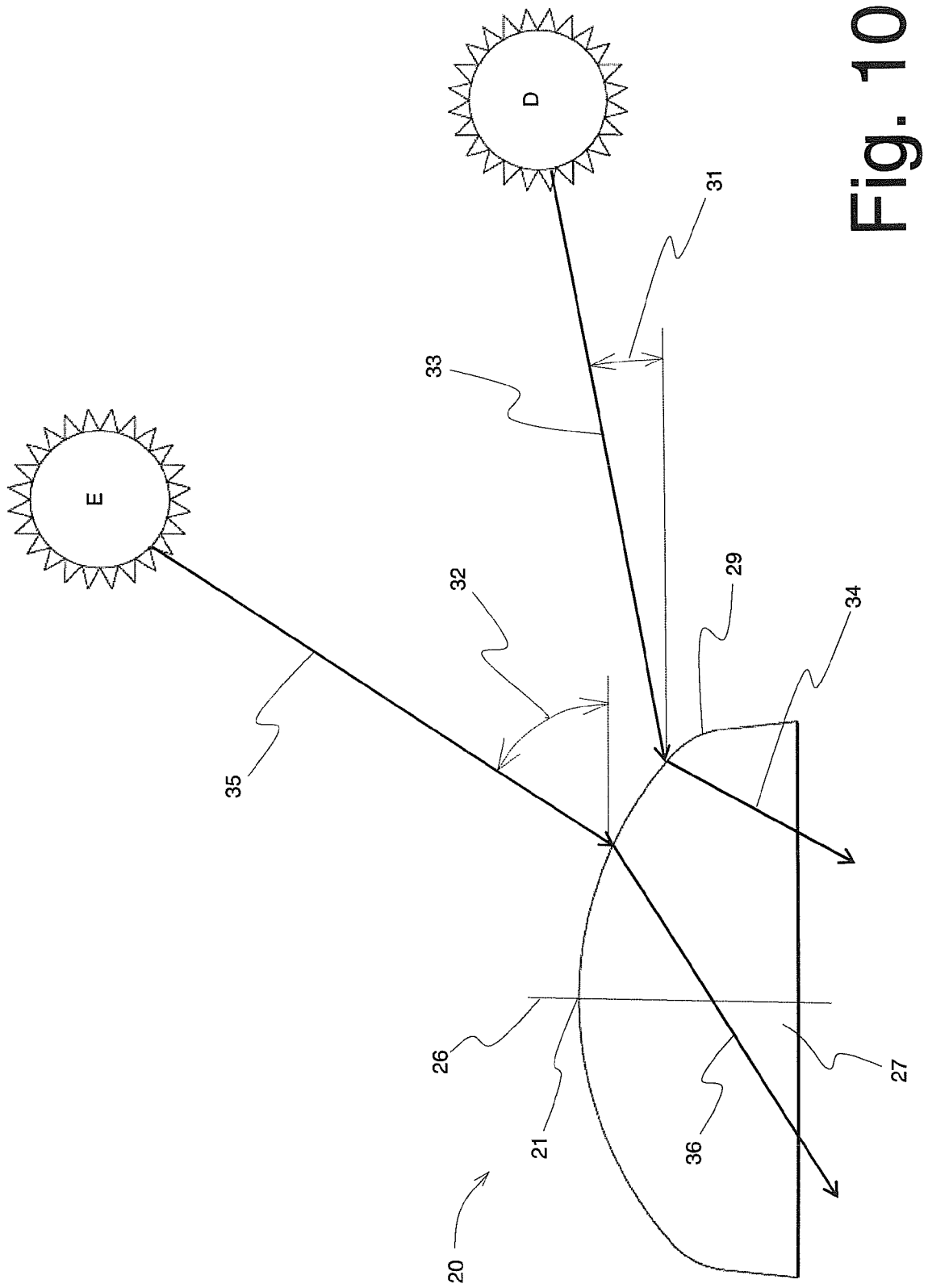
FIG. 10 is an operational illustration of a skylight sunlight redirector in accordance with certain aspects of the present invention.

FIG. 10 illustrates an operation of redirector 20. As depicted in FIG. 10, morning or evening sunlight from the Sun at position D casts a first incident sunbeam 33 toward redirector 20 at a first incident angle 31 that is relatively low. Mid-day sunlight from the Sun at position E casts a second incident sunbeam 35 toward redirector 20 at a second incident angle 32 that is relatively high. By operation of the ridges, grooves, and/or prisms, for examples ridge 40*a*, groove 50*a*, and/or prism 60*a*, first incident sunbeam 33 is redirected away from center 21, as illustrated by redirected first sunbeam 34. Second incident sunbeam 35, from a mid-day Sun position E, though, is redirected by the ridges, grooves, and/or prisms of redirector 20, for examples ridge 40*a*, groove 50*a*, and/or prism 60*a*, toward center 21, as depicted by redirected second sunbeam 36. In one embodiment of redirector 20, for example, redirector 20 has been configured with ridges, grooves, and/or prisms, for examples ridge 40*a*, groove 50*a*, and/or prism 60*a*, to redirect sunlight with a first incident angle 31 of between zero and fifty-five degrees from the horizontal away from center 21, as illustrated by redirected first sunbeam 34, and to redirect incident sunlight with a second incident angle 32 of greater than fifty-five degrees from the horizontal toward redirector 20 as illustrated by redirected second sunbeam 36.

The preceding examples, figures, discussion, and explanations consider specific embodiments and configurations. It is to be understood that such specific details are provided for illustrative purposes only and not as limitations to be applied in interpreting the appended claims. It will be further understood that the scope of the present technology further encompasses other embodiments that may become obvious to those skilled in the art. It is intended that the present invention includes such modifications and variations as come within the scope of the appended claims and their equivalence.

The invention claimed is:

1. A skylight sunlight redirector, comprising:
   A light transmitting body;
   The light transmitting body defining a center, a periphery, an equatorial side and an opposing polar side, and opposing East and West sides;
   The light transmitting body defining a plurality of ridges, each ridge:
   (a) Disposed within the periphery;
   (b) Defining a length with a first end and an opposing second end, the length extending circumferentially around a majority but not all of the body;
   (c) Disposed in a first arc relative to the periphery; and
   (d) Defining a cross-section, the cross-section continually varying along the length from the first end to the second end;
   wherein at least one of the ridges is configured to redirect light incident upon the body from the East and West sides away from the center; and
   wherein the first end is disposed on the East side, the second end is disposed on the West side, and the ridges extend through the equatorial side.

2. The skylight sunlight redirector of claim 1, wherein the ridges are disposed in a second arc about the center.

3. The skylight sunlight redirector of claim 2, wherein the ridges each comprise a first side and a second side and wherein the first side faces the center.

4. The skylight sunlight redirector of claim 3, wherein the second side faces the periphery.

5. The skylight sunlight redirector of claim 4, wherein the ridges are disposed on the bottom of the light transmitting body.

6. The skylight sunlight redirector of claim 1, wherein the body includes a transparent portion, the transparent portion extending from the center to the periphery.

7. The skylight sunlight redirector of claim 1, wherein at least some of the ridges comprise a Fresnel lens.

8. A skylight sunlight redirector, comprising:
   A light transmitting body, the light transmitting body having a first surface and an opposite second surface;
   The light transmitting body defining a center axis, an equatorial side and an opposing polar side, and opposing East and West sides;
   The light transmitting body defining a first cross-section, the first cross-section being at least partially curvilinear;
   The first surface carrying a plurality of grooves, each groove:
   (a) Being disposed within the at least partially curvilinear first cross-section;
   (b) Extending circumferentially around the body from a first end to an opposite second end, with a transparent zone disposed between the first end and the second end;
   (c) Defining a second cross-section, the second cross-section continually varying from the first end to the second end; and
   (d) Defining an arc relative to the center axis, the arc residing in a plane non-perpendicular to the center axis;
   wherein at least one of the grooves is configured to redirect light incident upon the body from the East and West sides away from the center axis; and
   wherein the first end is disposed on the East side, the second end is disposed on the West side, and the grooves extend through the equatorial side.

9. The skylight sunlight redirector of claim 8, wherein each groove is non-parallel to any other groove.

10. The skylight sunlight redirector of claim 9, wherein each groove has a triangular cross-section.

11. The skylight sunlight redirector of claim 10, wherein the body is a dome.

12. The skylight sunlight redirector of claim 8, wherein the first surface is the lower surface.

13. The skylight sunlight redirector of claim 11, wherein the body is symmetrical about the center axis.

14. A skylight sunlight redirector, comprising:
   A light transmitting convexity, the convexity comprising a center, a periphery, an equatorial side and an opposing polar side, and opposing East and West sides;
   A plurality of prisms carried by the convexity;

Each prism:
(a) Extending around the center less than the entirety of the convexity from a first end to an opposite second end;
(b) Defining a cross-section, the cross-section continually varying from the first end to the second end;
(c) Arcuate relative to the center;
Wherein at least one of the prisms is configured to redirect light incident upon the convexity from the East and West sides away from the center; and
Wherein at least one of the prisms is configured to redirect light incident upon the convexity from the equatorial side toward the convexity; and
Wherein the first end is disposed on the East side, the second end is disposed on the West side, and the prisms extend through the equatorial side.

15. The skylight sunlight redirector of claim 14, wherein a plurality of the prisms are non-parallel to any other of the prisms.

16. The skylight sunlight redirector of claim 14, wherein the convexity is symmetrical about the center.

17. The skylight sunlight redirector of claim 14, wherein the prisms are carried on the lower surface of the convexity.

18. The skylight sunlight redirector of claim 14, wherein the convexity is at least partially transparent.

19. The skylight sunlight redirector of claim 14, wherein the polar side is non-refractive.

* * * * *